F. MAEULEN AND G. L. VAN ALLEN.
FACING PIN FOR ARTIFICIAL TEETH.
APPLICATION FILED NOV. 30, 1920.
1,429,748.
Patented Sept. 19, 1922.
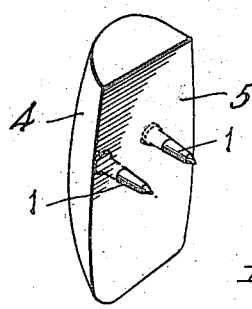
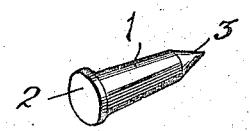
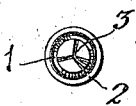
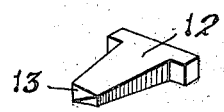
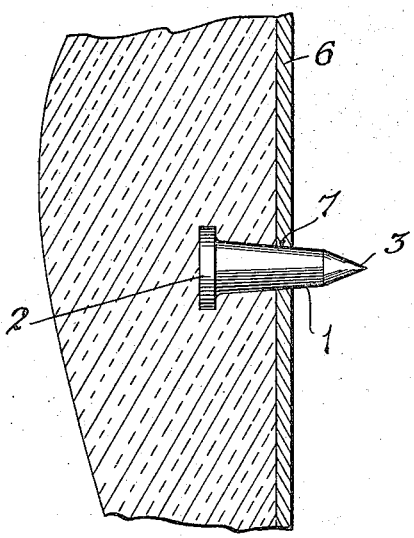
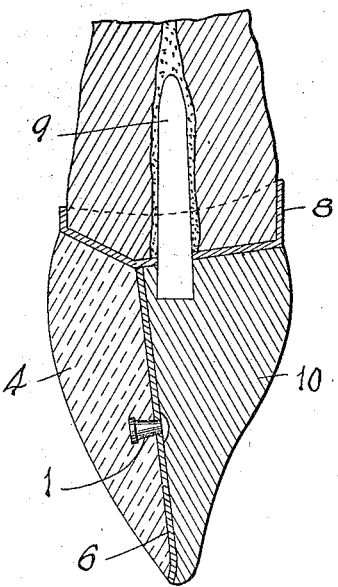
INVENTORS
Frederick Maeulen, and
George L. Van Allen,
BY Everett & Rook. ATTORNEYS.

Patented Sept. 19, 1922.

1,429,748

UNITED STATES PATENT OFFICE.

FREDERICK MAEULEN, OF RAHWAY, AND GEORGE L. VAN ALLEN, OF NEWARK, NEW JERSEY, ASSIGNORS TO BAKER & COMPANY, INC., A CORPORATION OF NEW JERSEY.

FACING PIN FOR ARTIFICIAL TEETH.

Application filed November 30, 1920. Serial No. 427,343.

*To all whom it may concern:*

Be it known that we, FREDERICK MAEULEN and GEORGE L. VAN ALLEN, citizens of the United States, and residents respectively of Rahway, in the county of Union and State of New Jersey, and Newark, in the county of Essex and State of New Jersey, have invented new and useful Improvements in Facing Pins for Artificial Teeth, of which the following is a specification.

This invention relates in general to artificial teeth and particularly to facing pins therefor such as are used for securing artificial tooth facings to their mountings or backings.

The objects of the invention are to provide a facing pin of the character described embodying an improved construction whereby the flux used in mounting the teeth is prevented from passing around the pin into contact with the tooth facing or porcelain and injuring or discoloring the same; to provide a facing pin which tightly fits itself into the hole in the backing through which it passes; to form the facing pin with tapering sides whereby the pin automatically tightly engages the sides of the opening as the pin passes through the backing; and to obtain other results and advantages as may be brought out by the following description.

Referring to the accompanying drawings, in which like numerals of reference indicate the same parts throughout the several views, Figure 1 is a perspective view of a facing pin embodying our invention;

Figure 2 is a perspective view of an artificial tooth facing having pins constructed in accordance with our invention secured therein;

Figure 3 is an end view of the pin shown in Fig. 1, looking at the same from the pointed end thereof;

Figure 4 is a similar view of a modified form of the pin;

Figure 5 is a perspective view of another modified form of the pin.

Figure 6 is a greatly enlarged vertical sectional view through the tooth facing and backing, showing the manner in which the pin pierces the tooth backing, and Figure 7 is a vertical longitudinal sectional view showing the tooth facing backed and mounted.

The facing pin 1 as shown in Figures 1 and 3 is preferably formed of wire and has one end thereof headed as at 2 while the other end thereof is pointed as at 3, the said point being either conical or wedge shaped as may be desired. The pin is tapered longitudinally from the head 2 toward the pointed end 3 thereof, as more clearly shown in Figures 1 and 5, so that the pointed end of the pin is slightly smaller in diameter than the other end thereof.

The pin may be secured to the facing 4 in any desired manner, as by firing, with the head thereof embedded within the body of the facing 4, and the pointed end of the pin projecting beyond the lingual face 5 of the tooth facing 4. In applying the tooth facing 4 to the backing 6, which is preferably formed of gold, the pointed end 3 is forced through the backing plate 6, and it will be noted that as the tapered sides of the pin progress through the opening thereby formed it will continuously and tightly fit itself within the said opening, forming inclined walls 7 in the opening as clearly shown in Figure 5 of the drawing. In this manner a tight engagement of the pin with the opening is assured, and the objectionable loose fit of the pin in the opening in the backing as is usual with the conventional straight-sided pin is thus avoided. While the pin is shown as tapered from the head 2 to the pointed end, it will be understood that it is only necessary that all sides of the pin converge from the point of emergence of the pin from the facing to the outer end of the pin. After the backing plate 6 is snugly fitted against the lingual face 5 of the tooth facing 4 the projecting end of the pin may be upset or bent against the backing plate in any desired manner to firmly secure the plate 6 to the facing 4, and the tooth facing is then ready for mounting in any desired way, usually by soldering.

One conventional manner of mounting a tooth facing is shown in Figure 6, in which the facing 4 and its backing plate 6 is secured to its mounting comprising the collar 8 and post 9, by the solder 10. In applying this solder to the backing plate and collar 8 with the usual construction of facing pin, it has been found that the flux used with the solder leaks through the opening in the backing plate around the facing pin and into contact with the tooth facing or porcelain 4 thereby injuring or discoloring the same. With our tapered facing pin 1 having its snug fit in the opening in the backing plate 6, it has been found that the flow of flux through the opening in the backing plate is prevented, thereby eliminating the possibility of injury of the tooth facing by the flux.

It will be understood that our invention is not limited to pins circular in cross-section, but may be applied to any desired form of pin. One modification of the invention is shown in Figure 4 in which it is applied to a pin 11 oval or elliptical in cross-section.

Another modification of our invention is shown by Figure 5 of the drawings comprising a flat pin 12 of substantially rectangular cross-section all sides of which converge toward the point 13. The operation of the pins shown in Figures 4 and 5 is substantially the same as that shown in Figure 1, the inclined or tapered sides of the pin tightly seating the same within the opening formed in the backing. It will also be understood that the head of the pin may be formed in any desired manner, and may be secured in the facing by any suitable means, the essential feature of the invention being the provision of a tapered pin which will automatically tightly fit itself into the opening in the backing plate as it passes through the backing, thereby preventing the flow of flux or solder around the pin into contact with the tooth facing.

Having thus described the invention, what we claim is:

1. An artificial tooth including a facing, and a pin embedded in said facing and having one end projecting outwardly from the lingual face thereof, all sides of the said projecting portion of the pin converging from the point where the pin emerges from the facing toward its outer end, so as to constantly and automatically maintain a tight engagement with the walls of an opening in a backing plate as the pin is forced therethrough to prevent flux or solder applied to the backing plate from leaking through said opening around said pin into engagement with the tooth facing.

2. An artificial tooth including a facing, and a pin embedded in said facing and having one end projecting outwardly from the lingual face thereof and pointed to penetrate a backing plate or the like, all sides of said projecting portion of the pin converging from the point where the pin emerges from said facing to said pointed end so that all sides of said pin constantly and automatically tightly engage the walls of an opening in a backing plate as the pin is forced therethrough to prevent flux or solder applied to the backing plate from leaking through said opening around said pin into engagement with the tooth facing.

FREDERICK MAEULEN.
GEORGE L. VAN ALLEN.